April 14, 1942. G. R. BAKER 2,279,362
MACHINE FOR ROASTING OR DRYING POWDERED, GRANULAR, OR LIKE MATERIAL
Filed July 11, 1938 5 Sheets-Sheet 4

G. R. Baker
Inventor

April 14, 1942. G. R. BAKER 2,279,362
MACHINE FOR ROASTING OR DRYING POWDERED, GRANULAR, OR LIKE MATERIAL Filed July 11, 1938 5 Sheets-Sheet 5

G. R. Baker
Inventor

Patented Apr. 14, 1942

2,279,362

UNITED STATES PATENT OFFICE 2,279,362

MACHINE FOR ROASTING OR DRYING POWDERED, GRANULAR, OR LIKE MATERIAL

George Ralph Baker, Peterborough, England, assignor to Baker Perkins Limited, Peterborough, England Application July 11, 1938, Serial No. 218,698
In Great Britain July 14, 1937

10 Claims. (Cl. 34—109)

This invention relates to machines for roasting or drying powdered or granular material or products in bean or berry form, the invention being particularly suitable for roasting cocoa beans. For convenience hereinafter the invention will be described in reference to the treatment of cocoa beans.

The invention has more particular reference to rotary machines wherein the beans are continually passed or poured from pocket to pocket of a series of sets of pockets provided at the inner surface of an outer drum and the outer side of an inner coaxial core member.

An aim of the invention is to provide means calculated to increase the output of machines of the above character while ensuring a thorough turning of the beans so that all sides or faces are equally exposed to the drying or heating action.

A further object of the invention is to provide improved means for imparting the necessary drying or roasting heat to the beans.

The invention consists in a roasting or drying machine comprising a drum provided with inwardly facing outer pockets and outwardly facing inner pockets so arranged that during rotation of the drum the beans pass forwardly from each outer pocket to an inner pocket from which they pass exclusively into the next forward outer pocket.

Deflector means may be associated with the outer pockets for causing a progressive movement of the beans around the drum.

The invention also consists in a machine comprising a drum provided with inwardly facing outer pockets and outwarding facing inner pockets adapted so that during rotation of the drum the beans are poured back and forth between the outer sets of pockets and the inner, and provided with deflector means upon or associated with the outer pockets for guiding the beans from the outer pockets to the inner pockets and/or vice versa.

The deflector means may comprise facets or supplementary surfaces supported on the under or reverse side of plates or vanes forming the outer pockets and in one preferred form the facets are of ridge or inverted V pattern and adapted to direct the beans so that they are transferred into a pocket opposite or in advance (i. e., in the direction of rotation of the pocket which they have left). The plates or vanes which form this outer pocket extend inwardly from the inner periphery of the drum between coaxial disc members or partitions. The inner set of pockets are formed by radial or offset plates or vanes extending outwardly between the partition discs.

A series of laterally adjacent sets of pockets are disposed axially of the drum between the partition discs and it may be convenient to refer to the inner and outer set of pockets between partitions as a group; thus it will be appreciated that there are a series of groups of pockets through which the beans pass on their travel from end to end of the drum.

Conveniently all the plates or vanes of each group are mounted upon an adjacent partition so that the vanes of a group together with the supporting partition therefor form a unit.

In one form the vanes or plates of the outer pockets are disposed at an angle within the range 40°–55° to a tangent, while the plates of the inner pockets may be radial, but it is preferred that they should be disposed slightly off but parallel to the radial position, while the angle between two plates or vanes is from about 23° to 25°.

Hot air from an air heater is induced to travel or pass through the roasting chamber, finding its way through apertures or perforations in the partitions under the influence of circulating means; for example the air may be forced through the roaster from the discharge of a fan or blower or the flow of air may be induced by coupling the outlet from the roaster to the suction of a fan. In either case in order to provide some regenerative effect it is preferred to cool the roasted beans after discharge by passing some or all of the air through them on its way to the fan or blower so that heat given up by the beans is imparted to the intake air.

In the accompanying drawings.

Figure 1:
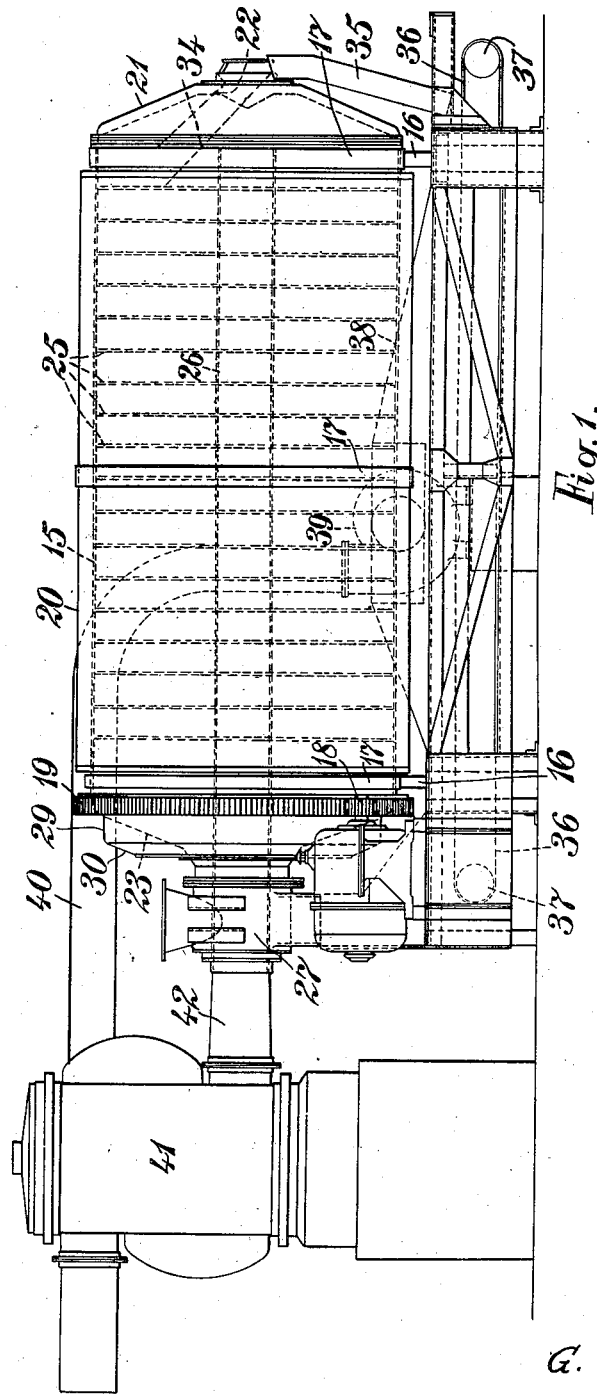
Figure 1 is an outside elevation.
Figure 2:
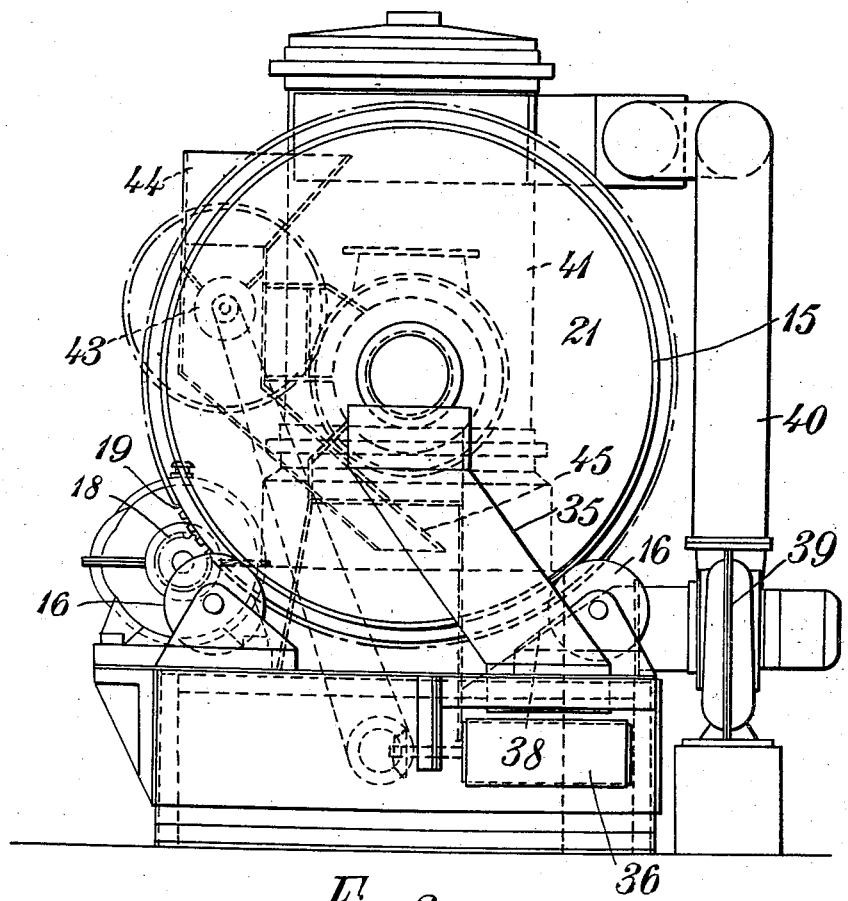
Figure 2 is an end elevation looking from right to left in Figure 1.
Figure 3:
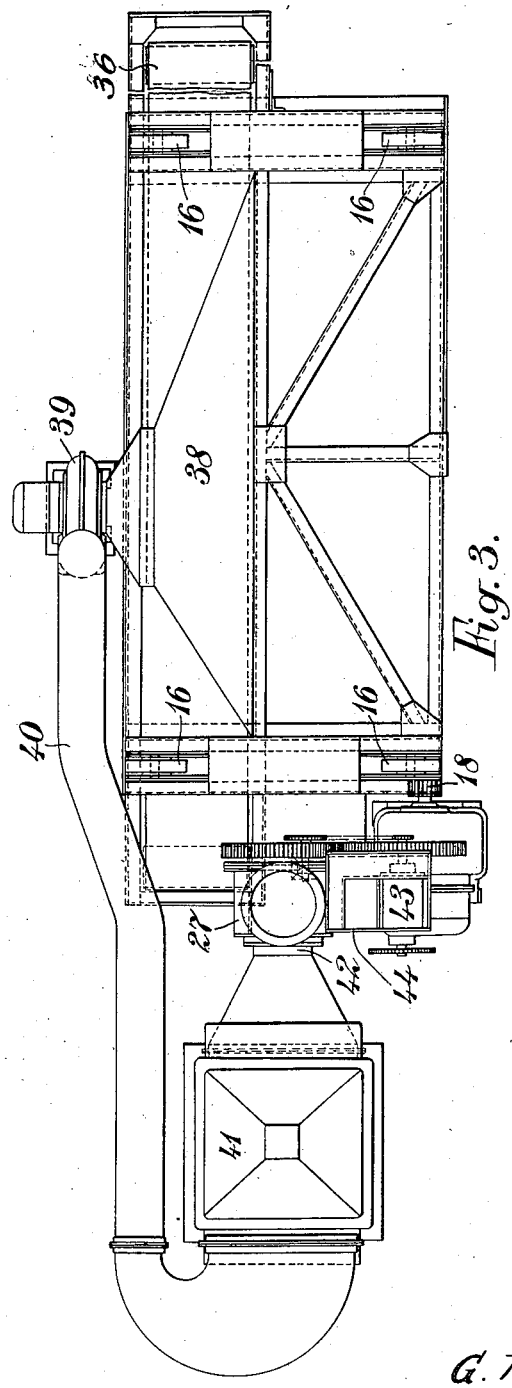
Figure 3 is a plan view with the drum removed.
Figure 4:
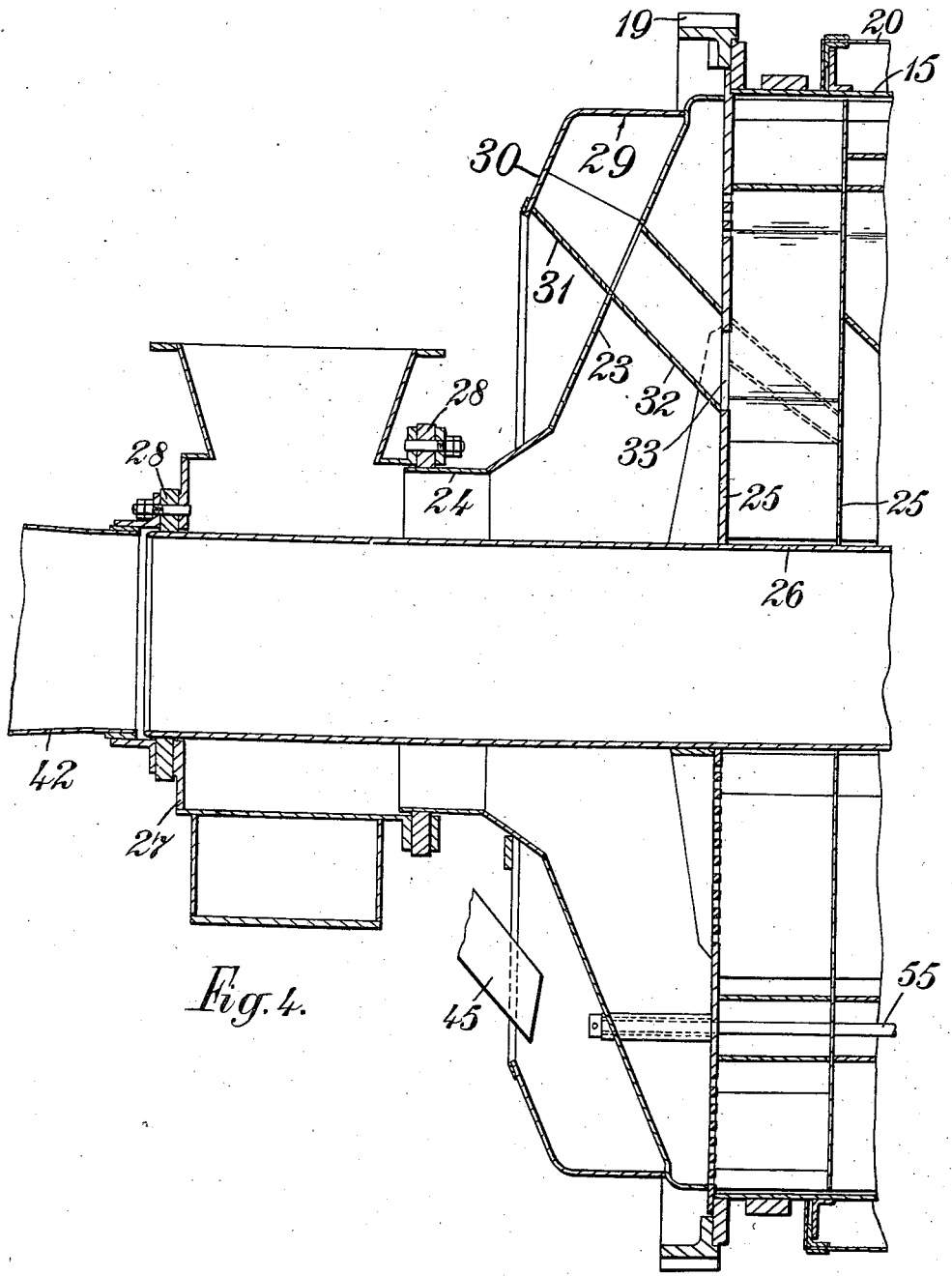
Figure 4 is a section of the feed end of the machine.
Figure 5:
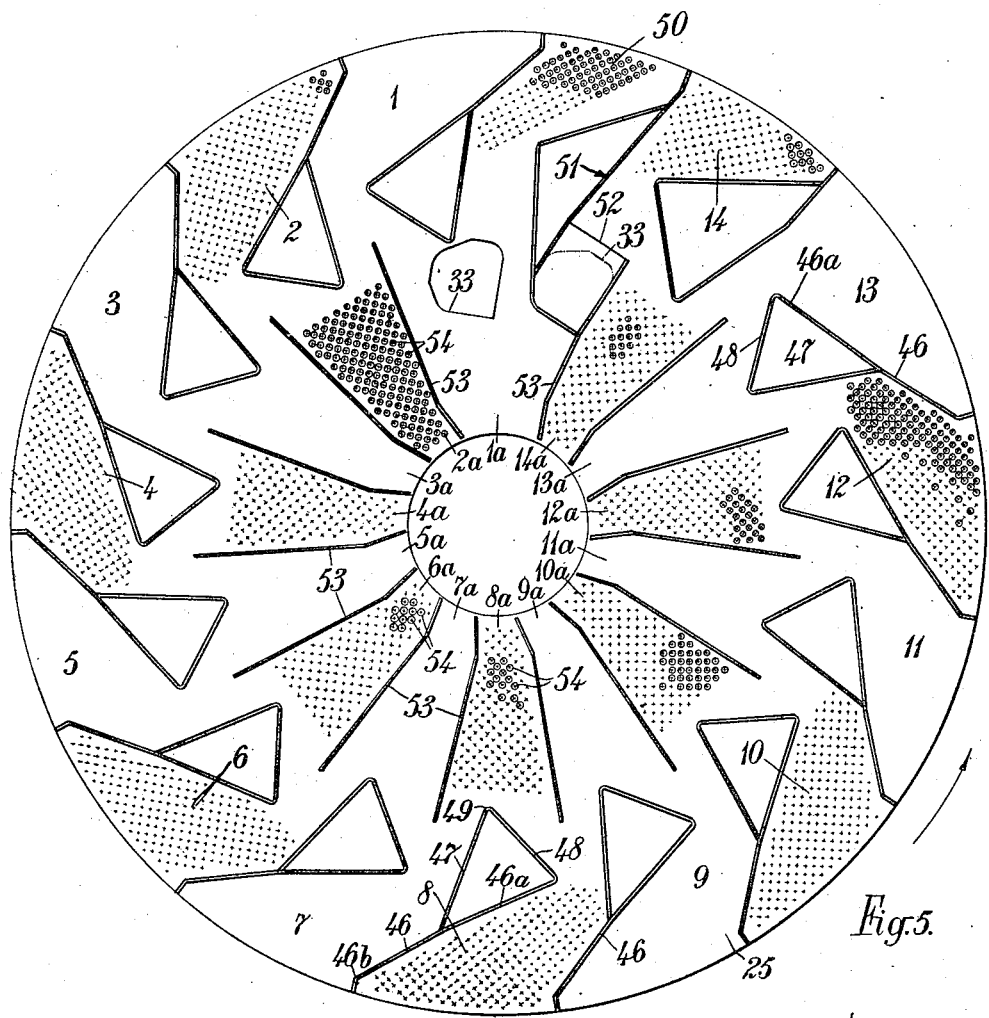
Figure 5 is a face view of one of the pocket sections or units.

In carrying the invention into effect according to one convenient mode, a sheet metal or other drum 15 is mounted for rotation about a horizontal axis (or an axis which may be slightly tilted or inclined as may be found desirable), the preferred mounting being of the tube mill type having supporting rollers 16 engaging peripheral tracks 17. The drive may be communicated by a pinion 18 meshing with a gear ring 19 on the outside of the drum. The drum is surrounded by a spaced wall 20 forming a jacket filled with slag wool or other suitable heat insulating material. One end of the drum has a double-walled closure 21 with an aperture through which a discharging chute 22 passes. The other or feed end of the drum is preferably of shallow conical formation 23 and terminates in a short tubular neck 24 (see Figure 4).

The interior of the drum is fitted with a series of sheet metal partitioning discs 25 which are pierced by central apertures through which a hollow core member 26 extends. The end discs 25 are secured to the drum 15 while the remaining discs are supported by the core member with a loose fit in the drum.

This core member 26 forms a conduit for hot air for drying and roasting purposes and adjacent the discharge end of the drum opens into the drum.

At the feed end of the drum, the core member 26 extends through the conical end 23 and the neck 24 and through a discharge box 27 for the circulating hot air. The core member 26 and neck 24 pass through packings 28 so that they may move relatively to the box 27.

Between adjacent pairs of partitions 25 inwardly and outwardly extending sets of plates or vanes are mounted for the formation of the pocket groups. The number of partitions will depend upon the number of groups of pockets required for the machine. Generally speaking machines comprising ten to twenty groups of pockets will be found adequate for most purposes but the number may be varied it will be appreciated according to the capacity desired and the rate of revolution of the drum and heat employed.

Around the conical end 23 of the drum a feed or charging chamber is formed which consists of a cylindrical wall 29 which is turned inwardly or provided with an inwardly inclined flange 30 adapted to afford a continuous wide opening around the axis of the drum so that a supply of beans may be fed into the chamber through the opening into the lower part of the chamber where they will lie, rolling over one another as the drum rotates until they are picked up by the internal feeding means of the drum which comprises a scoop or bucket 31 secured to the interior wall of the chamber so that on every rotation of the drum the scoop is adapted to gather up enough beans completely to charge one pocket of the roaster. This scoop is formed in one with or delivers to an inwardly directed chute 32 which communicates with an aperture 33 formed in the first of the partitioning discs 25 or end wall of the drum at a position to deliver beans into one of the inner sets of pockets of the group located between the first and second partitions.

The communication means between the succeeding groups of pockets will be described hereinafter.

The last partition of the series has an aperture into which is fitted a chute 34 which is formed in one or communicates with the final pocket of the outer set of the last group. The chute 34 delivers to the discharging chute 22 which projects through a discharge orifice located coaxially in the jacket end wall of the drum whereby the beans may be discharged into a vertical or other chute 35 preferably on to an air pervious endless conveyor 36 on which the beans are cooled. The conveyor passes over small diameter guide rollers 37 positioned so that the laps of the conveyor lie adjacent the opening or mouth of the air collecting hood 38. The hood is coupled to a fan 39 by which the air is passed through a conduit 40 and into an air heater 41 which may be heated in any suitable manner. From the air heater the heated air passes by a conduit 42 and into the hollow core 26, passing thence into the drum at the discharge end thereof and flowing back through the drum in contact with the beans and out by way of the air discharge box which may be coupled to a suitable outlet conduit. To permit the flow of the hot air through the drum, the partitions are perforated as will be hereafter more fully described.

According to this arrangement roasted beans in cooling give up a proportion of their heat to the air used within the drum and consequently some regenerative effect is achieved, however the air receives most of its heat in passing through the air heater 41.

As an alternative the conveyor or the upper lap thereof may traverse an air collecting chamber for the supply to the drum, the return lap of the conveyor passing beneath the air collecting chamber.

The beans may be fed continuously to the charging chamber as by an Archimedean screw or the equivalent at a predetermined rate or they may be fed in measured batches by any suitable known means such as a rotary measuring device 43 delivering to a chute 45 and which receives the beans from a hopper 44 to which they are fed by any convenient means.

According to one arrangement of pockets a series of plates are fixed in spaced relationship with one another between and normal to each pair of partitions 25. These plates extend inwardly from the inner surface of the drum to form the outer set of pockets and radially outward from the core 26 to form the inner set of pockets.

The pockets between each adjacent pair of partitions form a group and after the beans have passed through the pockets of one group, they are transferred to the next adjacent group.

The plates 46 with the adjacent portions of the partitions 25 and drum form the outer sets of pockets. In the present instance there are fourteen pockets numbered 1 to 14 which receive beans, and between pocket 1 and pocket 14 there is a space or gap 50 into which the beans from the preceding group of pockets are delivered to fall into the first of the inner set of pockets.

The plates 46 forming the outer sets of pockets are disposed so that they lie at an angle of about 50° to a tangent to the drum. Each plate may be flat but it is preferred that it should be angled, for example the inward half 46a of each plate (or a slightly greater proportion) may be at an angle (say, for instance, about 8°) to the plane of the outer portion of the plate adjacent the drum surface.

Upon this inward portion 46a of each plate, whether it be arranged at an angle to the outer portion 46 or not, and upon the reverse side or back of the plate, a double deflector is mounted.

This deflector is formed by a pair of facets or surfaces 47, 48 embracing between them an angle which in the arrangement being described is in the neighbourhood of 60°. The facets 47, 48 extend between and are normal to the partitioning discs 25. Looked at in transverse section of the drum, the facets 47, 48 with the inward portion 46a of pocket plate form a triangle, the apex of which includes the angle of 60° above mentioned and is directed inwards towards the axis of the drum while the base is represented by the inward portion 46a of the pocket plate. The apex of each of these triangles lies on a circle having a radius which is a little longer than half that of the drum and the ridge 49 made by each pair of facets lies between the ends of the pairs of plates which include between them pockets of the inner set as described below.

Thus the facet 48 of one plate 46 and the facet 47 of the adjoining plate 46 form a flared extension of an outer pocket.

The last pocket 14 of the outer set has no deflecting facets but is provided with a plate deflector 51 adapted to guide the beans to a transfer chute 52 which guides them sideways through a feed aperture 33 of the adjacent partition 25 into a pocket of the inner set of the next group of pockets.

In order to prevent any beans being caught or jammed in the locality where the plates 46 adjoin the inner peripheral drum surface the plates may be bent at 46b so that they each meet the drum surface at a right or other large angle.

The inner sets of pockets are formed by plates 53 extending outwardly from the core member of the drum. There are fourteen plates 53 in a set in the case under consideration forming thirteen pockets numbered 2a to 14a of equal size and a transfer feed pocket 1a of increased or double size. The plates 53 are slightly offset (half an inch or so) and parallel to radii spaced from one another at an angle of about 24° for the pockets 2a to 14a while the radii corresponding with pocket 1a embraces an angle of about 48°. The outer ends of the plates (as viewed in transverse section of the drum) terminate on a circle having a radius which is well over half that of the drum and so that their extreme edges lie in the channels or flared extensions defined by the deflector facets 47, 48 of the outer set of pockets.

Each partition 25 (except the last) has in that part which forms a cheek to the pockets 1a a feed aperture 33. The feed apertures of one group of pockets are the discharge apertures of the preceding group of pockets and hence are connected to the discharge plates or chutes 52 of the outlet of the preceding group. In the case of the first group of pockets the feed aperture 33 of the first partition is connected as already mentioned to the chute part 32 of a feed scoop or bucket in the charging chamber.

The plate 53 between pocket 1a and pocket 14a of the inner set and the plate 51 associated with pocket 14 of the outer set of pockets are joined towards their adjacent ends by the chute or discharge plate 52 referred to above for delivery of the beans out of pocket 14 of the outer set of one group of pockets into pocket 1a of the inner set of the next group through the feed aperture 33 referred to above. Thus it will be appreciated that the discharge and feed apertures are angularly displaced (in a direction counter to that of rotation of the drum) in each successive partition by about the pitch of the pockets.

For enabling the free passage of air through the drum as already mentioned the partitions 25 are provided with perforations 54, in order however to prevent the air from taking a preferential short cut, the perforations are arranged in zones which may be staggered or out of direct line. According to one form the portions of the partitions forming the cheeks of alternate pockets in the inner and outer sets may be provided with perforations so that the air has to filter through the beans as they lie in the pockets and as they are being poured from one pocket to another so that the air is prevented from passing directly from cheek to cheek.

The various groups may be secured in their correct relative positions to ensure transfer of the beans from group to group by keys or projections on the drum or core engaging grooves in the partitions or by longitudinally extending stay bolts 55 which pass through apertures in the partitions and in the ends of the drum. The plates forming the pockets and deflecting facets are secured to the partition 25 by welding or other convenient mode.

In operation, as the drum rotates the scoop 31 in the charging chamber raises a charge of beans and as the scoop approaches the axial plane of the drum starts to empty its contents down its chute 32 into pocket 1a of the inner set of the first group. The scoop will be emptied as it passes over the axis of the drum or shortly afterwards. This charge is received by pocket 1a of the inner set which as the plate 53 between pockets 1a and 2a approaches the horizontal delivers to pocket 1 of the outer set. In being poured out of inner pocket 1a the beans strike against the forward facing facet 48 of the deflector on the plate 46 of outer pocket 1 and also fall against the rearward facet 47 of the deflector on the back of the plate 46 of outer pocket 2 so that the beans are all constrained to be transferred from inner pocket 1a to outer pocket 1, the transfer being complete after the plate above mentioned has passed below the horizontal. The transferred charge remains in outer pocket 1 until the pocket approaches the vertical when it starts to pour its contents into pocket 2a of the inner set, the rearward facet 47 of the deflector on the plate 46 of outer pocket 2 serving to guide the beans into inner pocket 2a and prevent them shooting over into pocket 3a of the same set. Inner pocket 2a in turn as it approaches the horizontal starts to transfer the beans back to the outer set of pockets by depositing them in pocket 2 of that set. Pocket 2 of the outer pockets will discharge to pocket 3a of the inner set which will transfer to pocket 3 of the outer set and so on throughout the group. Finally the beans arrive in the final pocket 14 of the outer set of the group which discharges its beans down the plate chute 52 through the outlet aperture into pocket 1a of the inner set of the next group.

While or shortly after outer pocket 1 is delivering to inner pocket 2a of the first group as above described, pocket 1 of that group is again receiving from the feed scoop 31, and it will continue to receive fresh charges from the scoop at each revolution. Similarly inner pocket 1a of each succeeding group of pockets will at each revolution receive a charge from pocket 14 of the outer set of pockets of the preceding group, while pocket 14 of the final group will discharge to the chute 35 at the end of the drum and on to the air pervious cooling conveyor 36.

During the operation air is drawn into the hood 38 by the fan 39 passing over the beans on the conveyor 36 and taking up some of the heat therefrom. The air is forced through the conduit 40 and into the air heater 41 becoming heated thereby and flowing along the axial core 26 and into the drum. The heated air by the action of the fan is forced through the perforations in the partitions 25 whereby the beans are heated and finally escapes by way of the discharge box 27 to an outlet flue.

I claim:

1. A roasting or drying machine comprising a rotatable drum having outwardly facing inner pockets, plates extending inwardly from the periphery of the drum and forming inwardly facing outer pockets extending around the drum, angular deflecting means mounted adjacent and contacting the outer pocket forming plates and enclosing a series of dead spaces, said deflecting means having their apices parallel to the axis of the drum and projecting into the inner pockets to guide the material being treated from the inner to the outer pockets and from the outer to the inner pockets and cause a progressive movement of the material around the drum.

2. A roasting or drying machine comprising a rotatable drum, plates extending inwardly from the periphery of the drum and forming an outer series of inwardly facing pockets, plates extending outwardly from the centre of the drum and forming an inner series of outwardly facing pockets, angular deflecting plates located to the rear of and contacting with the outer pocket forming plates and forming therewith a series of dead spaces, said deflecting plates having their apices parallel to the axis of the drum and projecting into the inner pockets to guide material being treated from the inner to the outer pockets and from the outer to the inner pockets and cause a progressive movement of the material around the drum.

3. A roasting or drying machine comprising a rotatable drum, plates extending inwardly from the periphery of the drum and inclined forwardly in the direction of rotation, said plates forming an outer series of inwardly facing pockets, plates extending radially outward from the centre of the drum and forming an inner series of pockets, deflecting plates of V-shape in cross section located adjacent and in contact with the rear faces of the outer pocket forming plates, the apex of the V being parallel to the axis of the drum and projecting into an adjacent inner pocket to guide material being treated from the inner to the outer pockets and from the outer to the inner pockets and cause a progressive movement of the material around the drum.

4. A roasting or drying machine comprising a rotatable drum, plates extending inwardly from the periphery of the drum and forming an outer series of inwardly facing pockets, plates extending outwardly from the centre of the drum and forming an inner series of outwardly facing pockets, deflecting plates of V-shape in cross section located adjacent and in contact with the rear faces of the outer pocket forming plates at the inner ends thereof the apex of each deflecting plate being parallel to the axis of the drum and directed to and projecting into an adjacent inner pocket to guide material being treated from the inner to the outer pockets and from the outer to the inner pockets and cause a progressive movement of the material around the drum.

5. A rotating or drying machine comprising a rotatable drum, plates extending inwardly from the periphery of the drum and inclined in the direction of rotation at about 40°–55° to a tangent to the drum periphery, said plates forming an outer series of inwardly facing pockets, plates extending radially outward from the centre of the drum and forming an inner series of outwardly facing pockets, and deflecting plates of V-shape in cross section located adjacent and in contact with the rear faces of the outer pocket forming plates at the inner ends thereof, said deflecting plates enclosing an angle of about 60°, said angles being directed towards and projecting into an adjacent inner pocket to guide material being treated from the inner to the outer pockets and from the outer to the inner pockets and cause a progressive movement of the material around the drum.

6. A roasting or drying machine comprising a rotatable drum, a series of spaced partitions dividing the drum axially into a plurality of compartments, concentric series of plates located between the partitions and forming outwordly facing inner pockets and inwardly facing outer pockets, angular deflecting plates contacting the rear faces of the plates forming the outer pockets the apices of said deflecting plates being parallel to the axis of the drum and directed toward and into the inner pockets, said partitions having transfer openings and transfer chutes co-operating with said openings, the arrangement being such that during rotation of the drum said deflecting plates guide the material being treated from the inner to the outer pockets and from the outer to the inner pockets and cause a progressive movement of the material around the drum, and that the material from an outer pocket is directed laterally through the transfer opening in a partition and into an inner pocket of the next compartment.

7. A roasting or drying machine comprising a rotatable drum, a series of spaced partitions dividing the drum axially into a plurality of compartments, plates located between the partitions and forming concentric series of inner and outer pockets, the plates forming the inner pockets being radial while the plates forming the outer pockets are inclined forwardly in the direction of rotation, deflector plates of V-shape in cross section located to the rear of and in contact with the outer pocket plates, the apices of said deflector plates being parallel to the axis of the drum and directed toward and projecting into the inner pockets, transfer ports in said partitions located in one of the inner pockets and transfer chutes co-operating with said ports, the arrangement being such that during rotation of the drum said deflecting plates guide the material being treated from the inner to the outer pockets and from the outer to the inner pockets and cause a progressive movement of the material around the drum, and that the material from an outer pocket of one compartment is directed laterally through the transfer opening in a partition and into an inner pocket of the next compartment.

8. A roasting or drying machine comprising a rotatable drum, a hollow core mounted concentrically within the drum, an axial series of partitions dividing the drum into a plurality of compartments, said partitions having central apertures through which the hollow core extends, inner and outer series of plates located in said compartments and extending respectively to the hollow core and drum and forming inner and outer pockets, deflector means of V-shape in cross section located between the inner and outer pockets and contacting with the outer pocket forming plates, the apices of said deflector means projecting into the inner pockets to cause material being treated to flow from the inner to the outer pockets and vice versa and more progressively around the drum, transfer apertures in said partitions through which the material flows from compartment to compartment, spaced zones of perforations in said partitions for the passage of heating and drying air, and means for supplying the drum with heating and drying air through said hollow core.

9. A roasting or drying machine unit adapted to be inserted within a drum, comprising a partition plate having a central aperture adapted to surround a hollow core, concentric series of plates secured to one side of said partition plate and extending at right angles thereto, said plates comprising an inner set extending to said central aperture and an outer set extending to the periphery of the partition plate, angular deflecting plates contacting with the rear surfaces of said plates of the outer set and secured to said partition plate and the apices of said deflecting plates being directed toward and extending into the spaces between said plates of the inner set.

10. A roasting or drying machine unit adapted to be inserted within a drum comprising a circular partition plate having a central aperture adapted to surround a hollow core, concentric series of plates secured to one side of said partition plate and extending at right angles thereto, said plates comprising an inner set extending radially from said central aperture, and an outer set extending to the periphery of the partition plate and inclined at about 40°–55° to a tangent to said periphery, deflecting plates of V-shape in cross section secured to said partition plate and contacting with the rear surfaces of said plates of the outer set and the apices of said deflecting plates extending into adjacent spaces between said plates of the inner set.

GEORGE RALPH BAKER.